(12) United States Patent
Emrick et al.

(10) Patent No.: US 7,589,240 B2
(45) Date of Patent: Sep. 15, 2009

(54) QUANTUM DOTS TAILORED WITH ELECTRONICALLY-ACTIVE POLYMERS

(75) Inventors: Todd S. Emrick, South Deerfield, MA (US); Habib Skaff, Tampa, FL (US); Kevin Sill, Palmer, MA (US)

(73) Assignee: University of Massachusetts, Boston, MA (US)

( * ) Notice: Subject to any disclaimer, the term of this patent is extended or adjusted under 35 U.S.C. 154(b) by 221 days.

(21) Appl. No.: 11/199,033

(22) Filed: Aug. 8, 2005

(65) Prior Publication Data
US 2006/0128845 A1    Jun. 15, 2006

Related U.S. Application Data

(60) Provisional application No. 60/599,465, filed on Aug. 6, 2004.

(51) Int. Cl.
*C07F 9/02*    (2006.01)
*C09K 11/02*    (2006.01)
(52) U.S. Cl. .................. 568/14; 252/301.36
(58) Field of Classification Search ............ 252/301.36; 584/14; 568/14
See application file for complete search history.

(56) References Cited

U.S. PATENT DOCUMENTS 3,258,492 A * 6/1966 Ritt et al. .................... 568/14
5,516,940 A * 5/1996 Katti et al. .................. 564/14

2002/0020830 A1 * 2/2002 Bass et al. ............. 252/301.16

OTHER PUBLICATIONS

Belfield, Kevin, Chandrasekhar Chinna and Katherine Schafer. NewNLO Stilbene Derivatives Bearing Phosphonate Ester Electron-Withdrawing Groups, 1997, Tetrahedron Letters, vol. 38, No. 35, pp. 6131-6134.*

Leatherdale, CA; Kagan, CR; Morgan; NY; Empedocles, SA; Kastner, MA; and Bawendi, MG; Photoconductivity in CdSe Quantum Dot Solids; Physical Review B, Jul. 15, 2000-II, 2669-2680, vol. 62, No. 4.

Milliron, DJ; Alivisatos, AP; Pitois, C; Edder, C; and Frechet, JMJ; Electroactive Surfactant Designed to Mediate Electron Transfer Between CdSe Nanocrystals and Organic Semiconductors; Adv. Mater., Jan. 3, 2003, 58-61, vol. 15, No. 1.

Lee, J; Sundar, VC; Heine, JR; Bawendi, MG; and Jensen, KF; Full Color Emission from II-VI Semiconductor Quantum Dot-Polymer Composites; Adv. Mater., 2000, 1102-1105, vol. 12.

Schlamp, MC; Peng, X and Alivisatos, AP; Improved Efficiencies in Light Emitting Diodes Made with CdSe (CdS) Core/Shell Type Nanocrystals and a Semiconducting Polymer; J. Appl. Phys., Dec. 1, 1997; 5837-5842, vol. 82, No. 11.

(Continued)

*Primary Examiner*—Jerry Lorengo
*Assistant Examiner*—Kevin M Johnson
(74) *Attorney, Agent, or Firm*—Reinhart Boerner Van Deuren s.c.

(57) ABSTRACT

Cadmium selenide, and other quantum dot materials, can be integrated into thin films of poly(para-phenylene vinylene) (PPV) or other polymer compounds without aggregation of the nanocrystals. Solid-state photoluminescence spectra of composite materials prepared by these novel techniques reveal the effect of this greatly enhanced quantum dot-polymer interface relative to cases where the nanoparticles are aggregated, such that electronic communication and energy transfer between the nanoparticle and polymer components is made more efficient.

8 Claims, 7 Drawing Sheets

OTHER PUBLICATIONS

Gao, M; Richter, B and Kirstein, S; White-Light Electroluminescence from Self-Assembled Q-CdSe/PPV Multilayer Structures; Adv. Mater., 1997, 802-805, vol. 9, No. 10.

Huynh, Wu, Dittmer, JJ; and Alivisatos, AP; Hybrid Nanorod-Polymer Solar Cells, Science, Mar. 29, 2002, 2425-2427, vol. 295.

Schlamp, MC; Peng, XG; Kadavanich, AV; and Alivisatos, AP; Light Emitting Diodes Made with Epitaxially Grown CdSe/CdS Core/Shell Nanocrystals; Abstracts of Papers of the American Chemical Society, Apr. 13, 1997, 182-COLL, 213.

Chang et al. Efficient excitation transfer from polymer to nanocrystals. Applied Physics Letters. May 24, 2004, vol. 84, No. 21, p. 4295-7.

* cited by examiner

6

7

8

3

9

2

5

Figure 1B, con't.
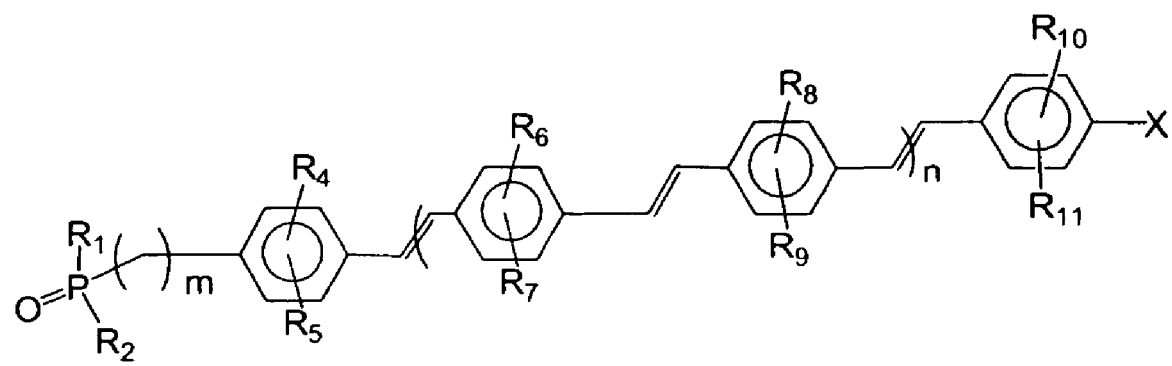
4

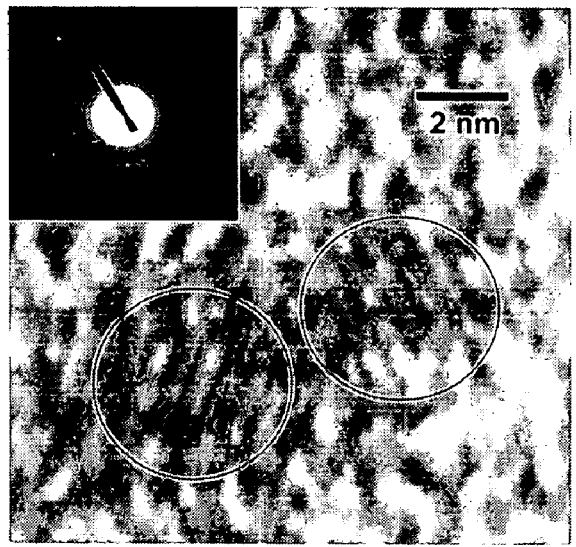 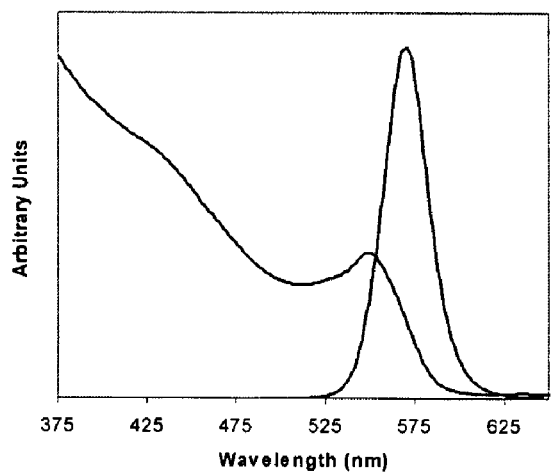
Figure 2A
Figure 2B

Figure 3A
a) 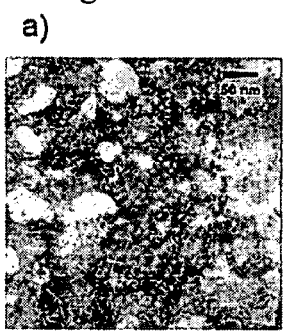 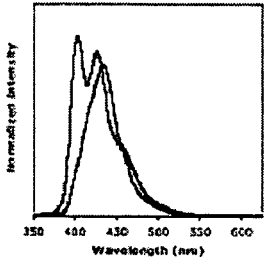
Figure 3B
b) 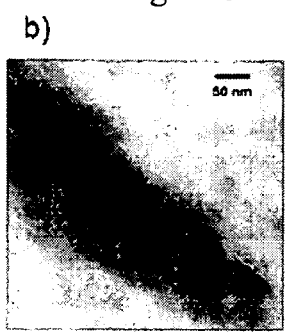 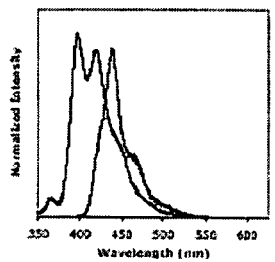
c) 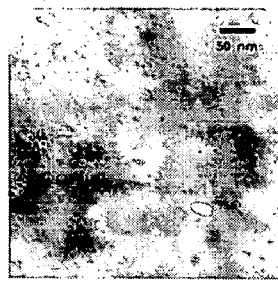 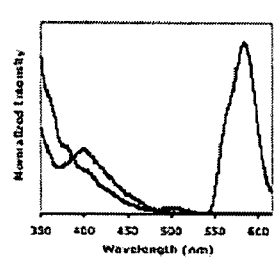
Figure 3C

US 7,589,240 B2

QUANTUM DOTS TAILORED WITH ELECTRONICALLY-ACTIVE POLYMERS

This application claims priority benefit from application Ser. No. 60/599,465 filed Aug. 6, 2004, the entirety of which is incorporated herein.

The United States government has certain rights to this invention pursuant to Grant No. 0239486 from the National Science Foundation to the University of Massachusetts, and the U.S. Army Research Laboratory Supported Polymer Materials Center of Excellence at the University of Massachusetts Amherst (DAAD19-01-2-0002P00005).

BACKGROUND OF THE INVENTION

Quantum dots provide a functional platform for novel materials and devices that utilize the unique physical properties that arise from their quantum confined nature. For semiconductor quantum dots such as cadmium selenide, CdSe, variation of particle size leads to continuous and predictable changes in fluorescence emission. Such quantum dots are under investigation as the basis for new materials and devices including photovoltaic cells, light emitting diodes, bio-sensors, and hybrid materials prepared by directed-and self-assembly techniques. However, exploitation of quantum dots in such applications requires an appropriate manipulation of their solubility or miscibility within the host environment. One approach involves tailoring of a ligand periphery on the quantum dot surface.

Seminal efforts and subsequent studies centered on the preparation of quantum dots have provided high quality samples covered with tri-n-octylphosphine oxide (TOPO) ligands to give a hydrophobic and chemically inert ligand shell. Use of functionalized ligands in the nanoparticle synthesis is generally precluded due to instability of such ligands at temperatures needed for the growth of high quality quantum dots. For example, conversion of TOPO-covered quantum dots to water-dispersible materials invariably requires alternatives to the TOPO periphery, typically accomplished by a ligand exchange. Recent efforts towards functionalization of quantum dots include the use of polymers, oligopeptides, oligonucleotides, and electronically active materials. However, there remain significant challenges associated with the use of ligand exchange, as surface oxidation, changes in quantum dot size and size-distribution, and diminished photoluminescence often accompany these chemistries. Nevertheless, ligand-exchange remains standard practice in the art for the introduction of new surface functionality to quantum dots.

The integration of CdSe quantum dots into electronically active polymer matrices is leading to a new generation of devices such as photovoltaic cells and light emitting diodes. Numerous advances, as well as difficulties, related to the fabrication of such devices from nanoparticle-based composites have been encountered. Previous work in this area utilized simple physical mixing of conventional quantum dot materials with electronically active polymers such as polythiophene and poly(para-phenylene vinylene). One key problem is centered at the polymer-quantum dot interface. Typically, as discussed above, the quantum dots are covered with, or bound by, TOPO, pyridine or other such surface binding or chelating ligand(s). The insulating TOPO-coverage limits charge transport between the quantum dots and the surrounding polymer matrix. Furthermore, the use of either TOPO-covered or TOPO-free ("stripped" or pyridine covered) quantum dots leads to nanoparticle aggregation within the matrix. Diminished interfacial interactions lead to an apparent self-quenching of nanoparticle emission, compensation for which comes with a cost of very high nanoparticle loading (e.g., 50-90 wt. percent).

BRIEF DESCRIPTION OF THE DRAWINGS

FIG. 2: A) Transmission electron micrograph at 650 K magnification of two functional CdSe nanoparticles (circled for clarity). The lattice structure observed, as well as the electron diffraction pattern (inset) shows the crystalline nature of the functionalized quantum dots; B) UV-Vis (left curve, band-edge absorption at 550 nm) and photoluminescence spectra (right curve, emission maximum at 570 nm; FWHM 30 nm) of ligand 1covered quantum dots in chloroform.

FIG. 3: TEM micrographs and fluorescence spectra (excitation 330nm) of PPV quantum dot hybrid materials. A) pyridine-covered CdSe nanocrystals blended with PPV; B) 1-functionalized CdSe nanocrystals blended with PPV; and B) composite CdSe nanocrystal -PPV, where PPV was grown from the nanocrystal surface. Each sample contained about 5wt. % nanocrystal—the images of $3a$ and $3b$ focus on nanocrystal aggregates within the blends. The effective dispersion of the quantum dots in PPV as a result of this invention is shown in the photoluminescence spectrum of FIG. $3c$, where CdSe nanocrystal emission dominates the spectrum despite the very low loading (about 5 wt %) used in the composite.

SUMMARY OF THE INVENTION

Figure 1A:
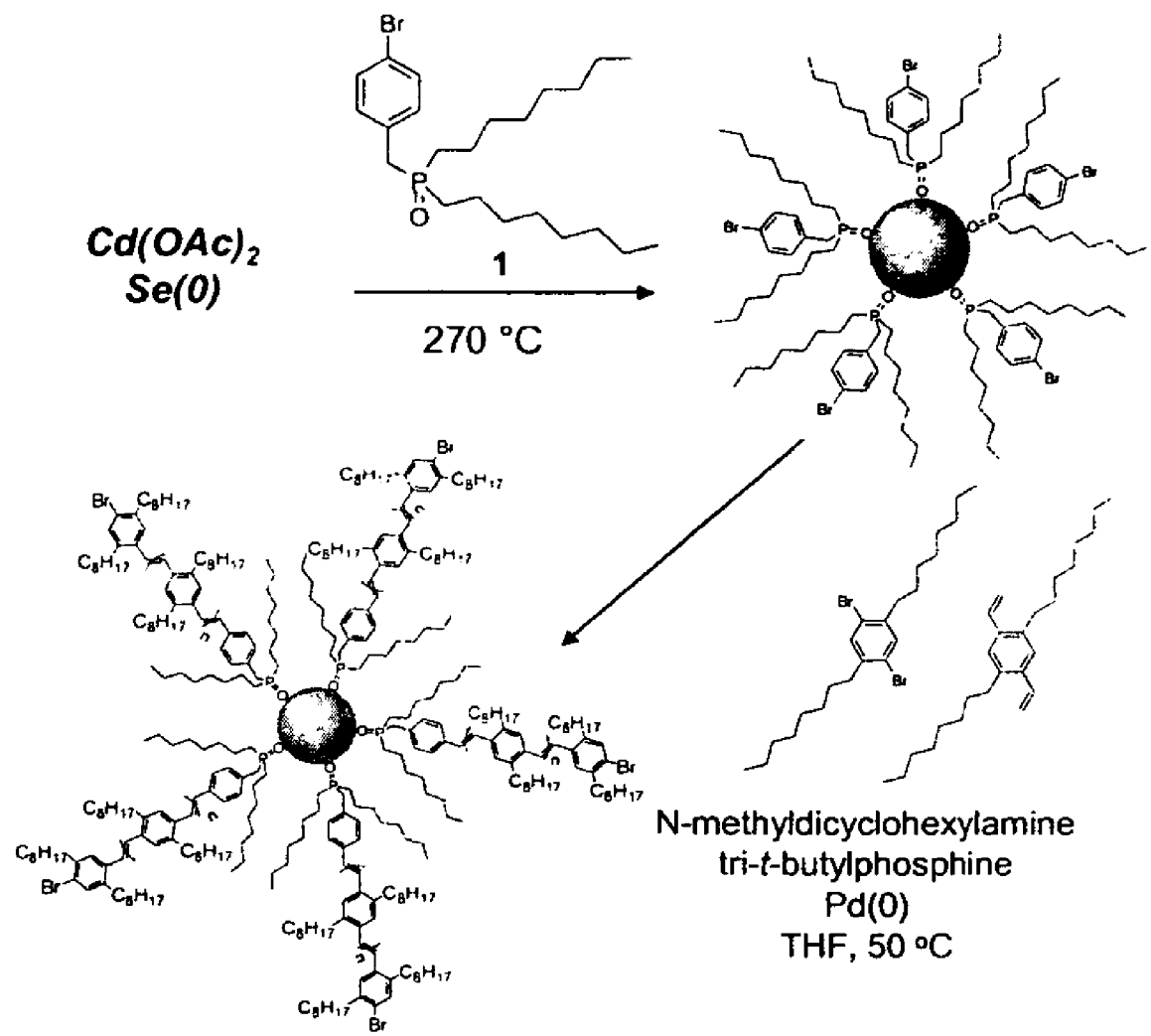
FIG. 1A: Synthesis of ligand 1covered and PPV-covered quantum dots, in accordance with the compounds, composites, compositions and related methods of this invention. Ligand 10 can be substituted effectively for ligand 1.

In light of the foregoing, it is an object of the present invention to provide functionalized ligand compounds, quantum dot composites of such compounds, thin film polymeric compositions incorporating such composites and/or related method(s) for their preparation and subsequent use, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide a range of compounds useful as ligands for a variety of inorganic semiconductor materials, whether or not nanoparticulate in dimension, such compounds functionalized for further reaction with monomeric or precursor components of a polymeric material.

It is an object of the present invention to provide one or more routes for the effective dispersal of nanoparticles in a polymer matrix and/or to maximize interfacial contact and charge transport between such nanoparticulate and polymeric components, such routes and dispersal relating to composites of such particles with reactive, functionalized ligand compounds.

It can be another object of the present invention to provide a composition comprising nanoparticles and one or more electronically-active polymers thereby minimizing nanoparticle loadings for effective performance of such materials.

It can be another object of the present invention, in conjunction with one or more of the preceding objectives, to efficiently utilize composites/compositions of the sort described herein for the thin film fabrication of light emitting diodes, sensors and related device structures, thereby substantially reducing the level of semiconductor material required for efficient, effective performance.

Other objects, features, benefits and advantages of the present invention will be apparent from this summary and its descriptions of certain embodiments, and will be readily apparent to those skilled in the art having knowledge of such quantum dot-polymeric materials and preparation techniques. Such objects, features, benefits and advantages will be apparent from the above as taken into conjunction with the accompanying examples, data, figures and all reasonable inferences to be drawn therefrom.

In part, the present invention can be directed to a phosphine oxide ligand compound of a formula

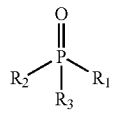

wherein $R_1$ and $R_2$ can be independently selected from H, alkyl, substituted alkyl, alkoxy and substituted alkoxy moieties, and $R_3$ can be selected from halo-substituted phenyl, vinyl-substituted phenyl, halo-substituted benzyl, vinyl-substituted benzyl, halo-substituted phenylalkyl and vinyl-substituted phenylalkyl moieties, with said $R_3$ alkyl ranging from $C_2$ to about $C_{10}$.

With respect to $R_1$ and $R_2$, such moieties can be substituted; that is, having a branched or cyclic configuration, and/or comprising a functional group or substituent. Alternatively, such moieties can be linear. Likewise, where $R_3$ comprises an alkyl moiety coupling a phenyl/benzyl moiety to phosphorous, linear or cyclic substituted/branched configurations can also be utilized. Regardless, without limitation, such alkyl moieties can range from $C_2$ to about $C_{14}$.

In certain embodiments, $R_1$ and $R_2$ can be independently selected from alkyl and alkoxy moieties, linear or substituted, ranging from about $C_2 \ldots C_6 \ldots$ or $C_8$ to about $C_{10} \ldots C_2 \ldots$ or about $C_{14}$. Likewise, without limitation as to the identity of $R_1$ or $R_2$, $R_3$ can be selected from ring-substituted phenyl and ring-substituted benzyl moieties. Representative ligand compounds can be represented by

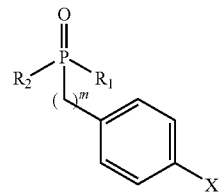

where m can be an integer ranging from 0 to about 14, and X can be selected from bromo and vinyl substituents. Ring substitution is limited only by available starting materials and steric considerations involving the identity of $R_1$ or $R_2$ and the ring position (i.e., 2, 3, 5 and/or 6) of any such substituent(s). Such ligand compounds can be utilized, as described below, in conjunction with a particulate substrate to provide a ligand-particulate composite. Such particulates can comprise photoactive materials. Without limitation, such particulates can comprise materials known in the art as quantum dots; fluorophores that under certain conditions have high quantum yields, narrow fluorescence emission bands, high absorbency, and can provide excitation of one or more different emission colors using a single wavelength for excitation. Such particulates can be selected from various emissive semiconductor materials known in the art, including but not limited to CdSe, ZnSe, CdTe and ZnTe, together with such particulates comprising one or more surface coatings (e.g., without limitation, sulfide, such as CdS or ZnS) thereon.

Alternatively, this invention can be directed to conjugated polymeric ligand compounds of the formula

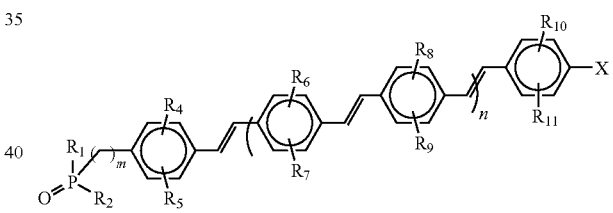

wherein, m can be an integer as described above, and $R_1$ and $R_2$ can also be as described above; $R_4$ and $R_5$ can be independently selected from H, alkyl, substituted alkyl, alkoxy, and substituted alkoxy moieties, and with further reference to $R_1$ and $R_2$; $R_6$—$R_9$ can be independently selected from the moieties described above in conjunction with $R_1$—$R_2$ and $P_4$—$R_5$; n can be an integer ranging from 1 to about 12; and X can be selected from halogen and vinyl substitutents on the terminal phenylene-vinylene unit of said compound.

In certain embodiments, the number of phenylene-vinylene units can range from 1 to about 12 or more. $R_{10}$ and $R_{11}$ can be independently selected from moieties described in conjunction with $R_1$—$R_2$ and corresponding to $R_6$ and $R_7$ and/or $R_8$ and $R_9$; that is, the conjugated ligand compound reflecting one or both monomeric starting materials and termination of a polymerization reaction leading thereto. Regardless, X can be selected from a substituent active in the preparation of such a ligand compound. For example, without limitation, X can be selected from halogen and vinyl substituents utilized in conjunction with the polymerization reactions described herein. Alternatively, X can have an identity reflecting a polymer capping group known in the art and/or subsequent chemistry thereon.

In certain embodiments, m can be 0 or 1, and n can range from about 3 to about 6. Likewise, in certain embodiments, at least one phenyl moiety can be substituted, with such substitution on at least one of the 2 3 and 5-6 positions thereof. In certain other embodiments, as illustrated below, such phenyl moieties can be disubstituted, with $R_4$—$R_{11}$ as described above. Regardless of substitution or substitution pattern, $R_4$—$R_5$ and/or $R_6$—$R_{11}$ can be chosen in view of $R_1$ and $R_2$ to meet certain physical or process parameters or considerations regarding ligand synthesis or use thereof. As described above, in conjunction with non-polymeric ligands, the conjugated ligand compounds can be part of a ligand-particulate composite comprising an emissive particulate. Such a particulate can be selected from CdSe, ZnSe, CdTe, ZnTe and sulfide compositions thereof. Without limitation, as to particulate identity, such a composite can be part of a composition comprising a polymer component, such components including electronically-active polymers.

In part, this invention can also be directed to a composition comprising a polymer matrix comprising a poly(phenylene-vinylene) compound; and a composite comprising a ligand component and an emissive particulate. Such ligand components can be selected from the polymerized conjugated ligand compounds described above, as provided in conjunction with a particulate of the type described herein. While such compositions can comprise a poly(phenylene-vinylene) compound, structurally corresponding to or a variation of the polymerized ligand component, such compositions can also comprise one or more other electronically-active polymer compounds (e.g., without limitation, a polythiophene) known in the art. Given a particulate-ligand composite of this invention, with selection of appropriate monomeric starting materials, a polymerized ligand component can be prepared concomitantly with a polymer matrix from the monomeric materials.

Accordingly, this invention can also comprise a method of using such a ligand component to incorporate an emissive particulate into a polymer composition. Such a method comprises providing a composite of an emissive particle and a non-polymerized ligand component; and contacting the composite and one or a combination of monomeric starting materials under conditions sufficient for monomer polymerization and polymerization of the monomer with the ligand component. Ligand components of such composites include those discussed above. Without limitation, in certain embodiments, $R_3$ can comprise either a phenyl or benzyl moiety, either 4-halogen or 4-vinyl substituted. Likewise, without limitation, monomeric starting materials can include a corresponding AB-type monomer or a combination of corresponding AA-type and BB-type monomers. As described above, substitution and related structural features of the polymeric matrix and polymerized ligands are limited only by selection of starting materials and available substitution. Monomers can, accordingly, be selected to provide substitution affecting various solubility concerns during preparation, reaction of or relating to the polymerized product.

DETAILED DESCRIPTION OF CERTAIN EMBODIMENTS

As discussed above, the present invention comprises ligand compounds capable of binding, chelating, coordinating and/or interacting with semiconductor fluorescent materials known in the art as quantum dots, such materials including but not limited to CdSe. Certain embodiments are illustrated with reference to compound 1, a 4-bromobenzyl analog of a tri-alkylphosphine oxide. (See, FIG. 1A) Other such ligands are represented by the structural formula of compound 2 in FIG. 1B, where X comprises a halogen substituent, and $R_1$ and $R_2$ are independently selected from hydrogen, alkyl, substituted alkyl, alkoxy and substituted alkoxy moieties. More generally, such ligands can also be selected from compounds of structural formula 3 (FIG. 1B), where $R_1$ and $R_2$ can be as described above, and $R_3$ can comprise a moiety useful in conjunction with the polymerization reactions discussed below.

Figure 1B:
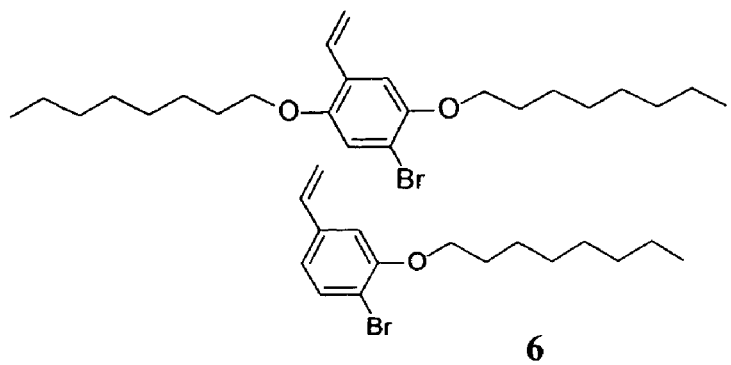
FIG. 1B: Structural formulae of non-limiting representative ligand compounds useful in preparation of the composites and/or compositions of this invention.
Figure 1B:
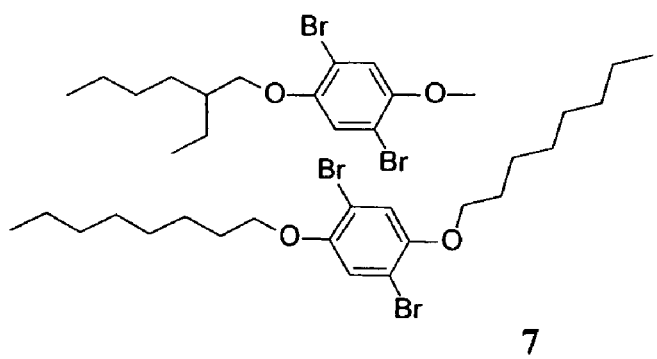
Figure 1B:
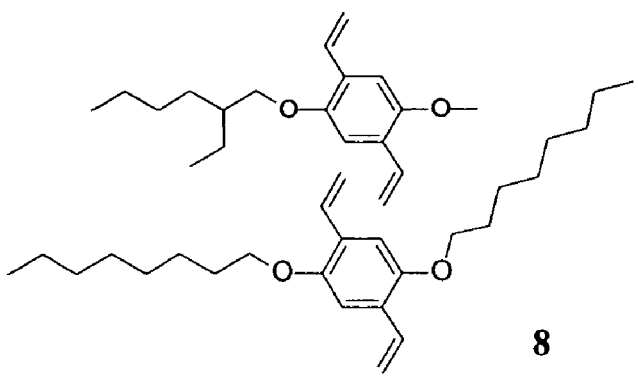
Figure 1B:
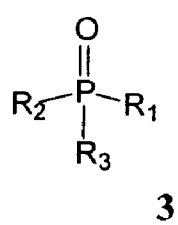
Figure 1B:
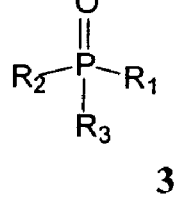
Figure 1B:
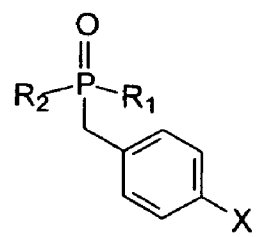
Figure 1B:
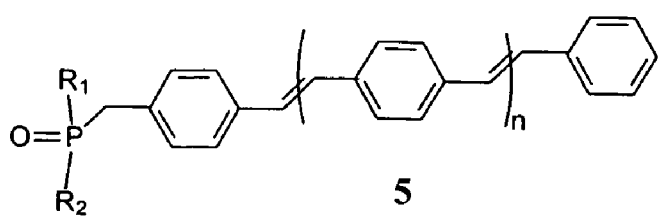

With further reference to FIG. 1B, ligands of this invention can further comprise compound 4, wherein $R_1$—$R_2$ and $R_4$—$R_{11}$ can be independently selected from hydrogen, alkyl and substituted alkyl, alkoxy and substituted alkoxy moieties, such compounds synthetically available as described herein. Reaction of any of compounds 1-3 in the presence of appropriately substituted mono- or divinyl- and mono- or dibromobenzene reagents provides conjugated ligand compound 4, where the indicated substituents can vary depending upon choice of such starting materials and/or with consideration of desired solubility or miscibility with another polymeric material. Without limitation, each of $R_1$—$R_2$, $R_4$—$R_5$ and $R_6$—$R_{11}$ can be independently selected from linear or branched alkyl (e.g., about $C_1$— about $C_{14}$) moieties for further use with and solubility in common organic solvents. Alternatively, by choice of the aforementioned vinyl- or bromo-reagents, $R_4$—$R_{11}$ can be hydrogen with the resulting ligand shown as compound 5.

Various vinyl- and/or bromo-monomeric reagents useful in conjunction with the composites and compositions of this invention are shown in FIG. 1B. Using the AB designation, compounds 6 represent examples of vinyl-bromo AB monomers for reaction with any of compounds 1-3, homologs or ring substituted variations thereof, enroute to conjugated ligand compound 4, where $R_6$—$R_{11}$ are hydrogen and the alkoxy moieties shown. Compounds 7 represent examples of dibromo AA monomers where substituents $R_6$—$R_9$ or $R_{10}$—$R_{11}$ in compound 4 are the alkoxy and substituted alkoxy moieties shown. Likewise, compounds 8 represent examples of divinyl AA monomers useful in the preparation of corresponding ligand compound 4. Of course, substituent identity and position on the phenyl ring of compounds 6-8 can vary, limited only by commercial or synthetic availability. It will be also understood by those skilled in the art that any such vinyl and/or bromo monomeric reagents can be polymerized with components other than phosphine compounds 1-3. For instance, alkylthiol 9 (where X comprises a halogen or a vinyl substituent, and n can range from 0 to about 10 . . . about 14 or greater) can be used in reaction with any vinyl and/or bromo reagent, including those described in FIGS. 1A-B, under appropriate reaction conditions, to provide a corresponding conjugated thiol ligand.

As such, the present invention also includes composites comprising emissive semiconductor materials or particles bound, chelated, coordinated and/or interactive with any of the aforementioned ligand compounds. While semiconductor quantum dots such as CdSe can be used, various other emissive particulate materials are available, as would be understood by those skilled in the art made aware of this invention. Such materials include but are not limited to zinc selenide (ZnSe) and cadmium or zinc telluride (CdTe or ZnTe) and other known inorganic semiconductors, including core-shell semiconductor nanoparticles, for example CdSe (core)-ZnS (shell) particles.

In part, as illustrated elsewhere herein, this invention can also be directed to compositions comprising composites of any of the aforementioned particulate materials and polymerized ligands of compound 4, and a matrix of one or more electronically-active or photoactive polymers, such compositions as can be used in the thin film fabrication of various device structures of the sort described herein. In certain embodiments, illustrating various benefits of this invention, the polymerized ligands and polymeric matrix components can comprise and be derived from common starting materials, such that ligand preparation is concomitant with formation of a polymer matrix, facilitating composite dispersal therein. Under appropriate reaction conditions, divinyl-and dibromobenzene compounds can be coupled one to another, as well as to a composite comprising a ligand of compounds 1-3, to effectively provide a composition comprising a composite of ligand compound 4 incorporated into a corresponding poly (para-phenylene vinylene) matrix. With reference to FIGS. 1A-B, substituents $R_6$—$R_9$ and $R_{10}$—$R_{11}$ of ligand compound 4 can also be substituents common with the corresponding polymeric component.

In accordance with the preceding, the present invention also provides a method of preparing a composition comprising a particulate/ligand composite and a polymeric component. Concomitant ligand preparation and polymerization can effectively incorporate and disperse such a composite within the polymeric component. Data, of the sort provided below, shows such composite/polymer contact enhances semiconductor emission and photoluminescence of the resulting composition, as compared to physical mixtures (blends) commonly practiced in the prior art.

As discussed above, ligand 1 (also shown below) can be used for surface functionalization of CdSe quantum dots to give a material for subsequent growth of poly(para-phenylene vinylene) (PPV) from the nanoparticle surface. Likewise, ligand 10 can be used for the preparation, characterization and study of PPV-functionalized CdSe nanoparticles. As known in the art, ligand 1 is prepared from the reaction of di-n-octyl phosphine oxide with 4-bromobenzyl chloride, as described previously, and ligand 10 is synthesized by a copper mediated coupling di-n-octyl phosphine oxide with 4-bromo-iodobenzene, as described more fully in the following examples.

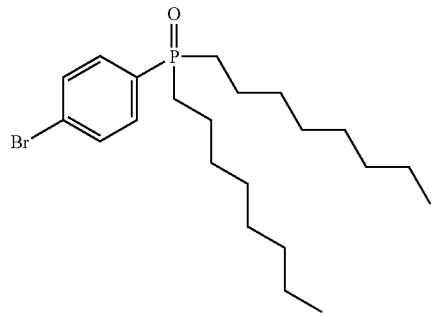

-continued

10

Figure 5A:
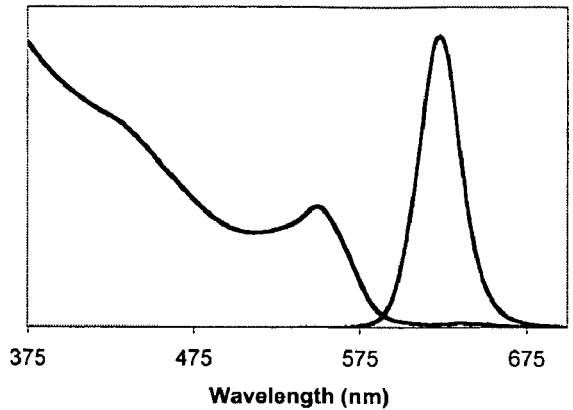
FIG. 5: Graphic characterization of a representative ligand particle composite of this invention, using CdSe nanoparticles; A) UV-Vis spectrum, left curve and fluorescence spectrum, right curve; and B) TEM micrograph, showing discrete unaggregated nanoparticles within the composite material.
Figure 5B:
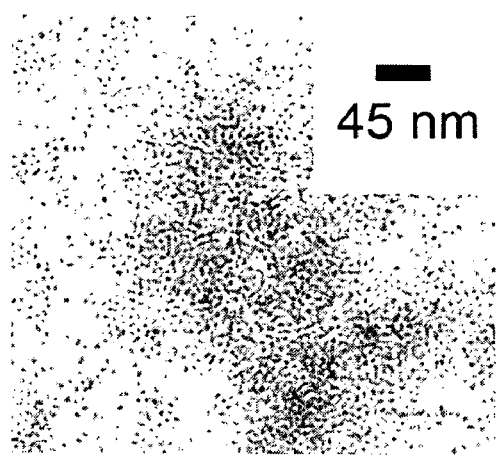

The preparation of these and other arylbromide-functionalized nanoparticles is generally analogous to the TOPO-covered nanoparticle synthesis, but with substitution of the present ligands for TOPO. Production of CdSe-ligand composites from Cd and Se was found to proceed optimally at temperatures of about 240-about 270° C. in the case of ligand 1, and at about 220-about 250° C. in the case of ligand 10. Spectroscopic and microscopic characterization of the aryl-bromide-covered CdSe nanoparticles reveals characteristics of the CdSe particles that resemble the TOPO-covered particles of the prior art. (See FIGS. 5A-5B.) Evidence for a narrow particle size distribution is found in the narrow fluorescence emission spectrum (FIG. 5A, right curve), and in the transmission electron micrograph (FIG. 5B). A sharp transition in the UV-Vis spectrum (FIG. 5A, left curve) denotes the CdSe nanoparticle band-edge absorption. Nuclear magnetic resonance (NMR) spectroscopy indicates the presence of the aryl-bromide groups of 1 or 10.

Composite materials comprising CdSe nanoparticles and conjugated polymers can be performed by Heck-coupling polymerization of appropriate monomers in the presence of the 1 or 10-covered CdSe nanoparticles. Both AA+BB and AB-style polymerizations were used, where A and B each represent a functionality reactive with the other, but not itself. Difunctional AB-type monomers are useful in embodiments where balance of stoichiometry is important. Monomers substituted with n-alkyl or n-alkoxy moieties serve to increase solubility of the resulting composites; e.g., n-octyl and n-dodecyl chains in certain embodiments. With reference to the non-limiting illustrative monomers of FIG. 1B, three AB type monomers of the type shown below can be used, although many other aryl halides with pendant vinyl groups could also serve as effective AB monomers in the context of this invention. Likewise, with reference to the representative monomers of FIG. 1B, three sets of AA and BB monomers are also provided below, each of which can be used under reaction conditions as described herein for polymerization one with the other, and with ligands such as 1 and 10.

AA + BB Monomers

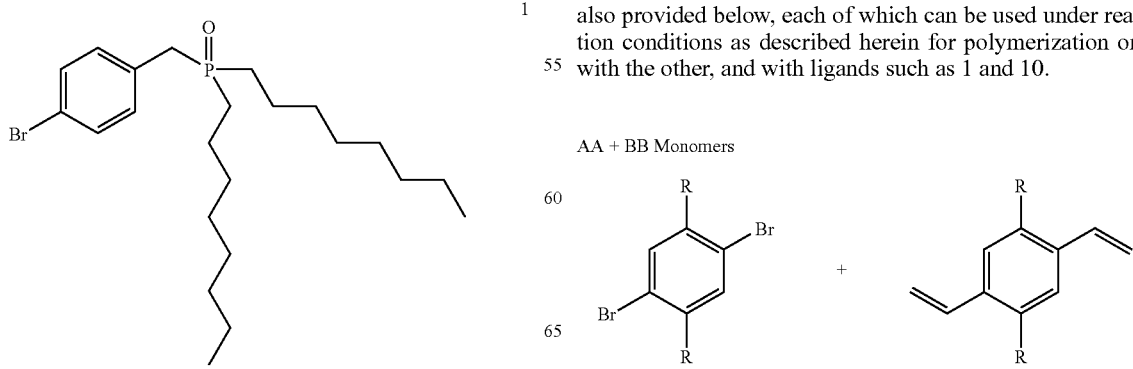

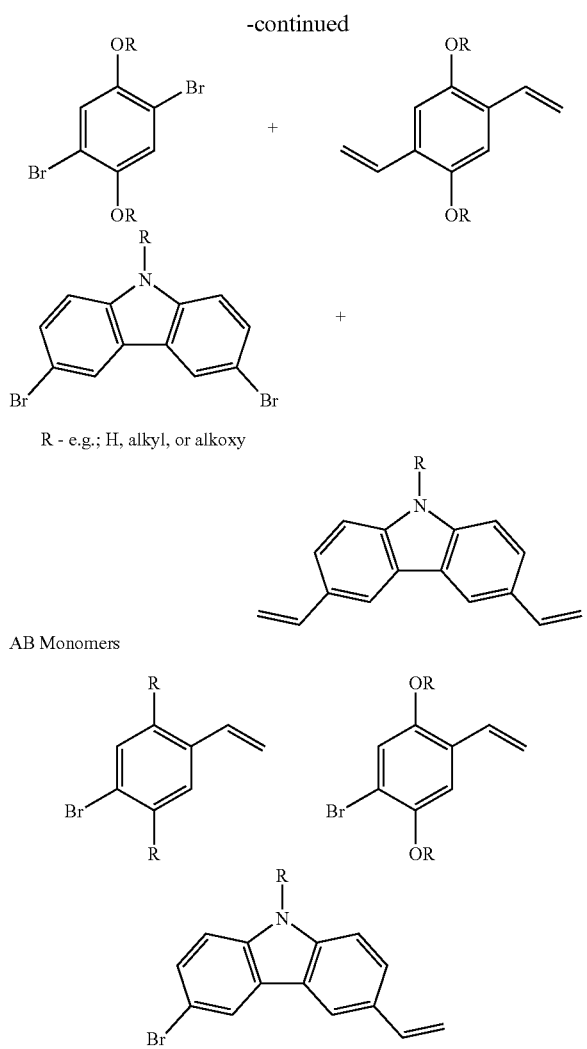

R - e.g.; H, alkyl, or alkoxy

AB Monomers

For effective results, nanoparticle-polymer composites should be prepared with minimal-to-no loss of inherent nanoparticle properties, especially with regards to nanoparticle size, size distribution, photoluminescence intensity, and photoluminescence emission profile. This can be achieved by using a minimal amount of polymerization catalyst. An excess of catalyst beyond the minimum can result in nanoparticle degradation. Accordingly, it was found that pentamers and hexamers of the monomers used could be grown from the nanoparticle surface with little or no nanoparticle degradation. For example, use of twenty weight percent tetrakistriphenylphosphine palladium (0) [Pd(PPh$_3$)$_4$] with respect to CdSe was preferred for most of the polymerizations. Due to the air sensitive nature of both the catalyst and the nanoparticles, all polymerizations were performed in a nitrogen atmosphere drybox. (A useful base was found to be N-methyldicyclohexylamine, used as 1.1 equivalents relative to monomer. As a solvent, tetrahydrofuran provides good results in certain embodiments over dimethylformamide, dioxane, or toluene.) Polymerization temperatures of about 90° C. lead to the desired composites/compositions with little-to-no nanoparticle degradation or formation of palladium black. Polymerizations are typically complete after 16 hours. Purification of the composite and compositional materials is achieved by centrifugation of the reaction solution, decanting, then addition of methanol to the decanted solution in order to precipitate the desired particulate-polymer composite and composition. Storage in solution is preferred to the solid state. The material is soluble in hexanes, chloroform, toluene, dimethylformamide, and tetrahydrofuran, the latter being found optimal for long shelf-life.

Figure 6A:
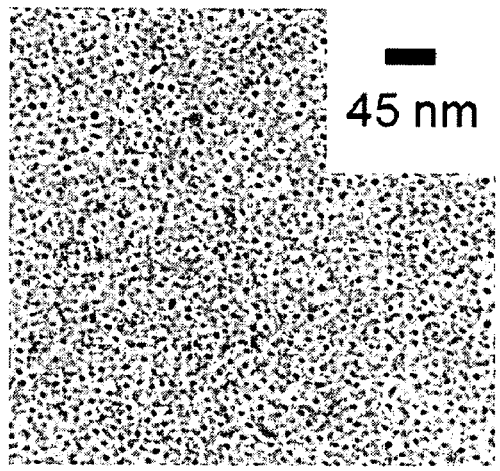
FIG. 6: Graphic characterizations of a representative composite-polymer composition of this invention, CdSe-ligand composites in a PPV matrix; A) TEM micrograph showing random distribution with no aggregation; and B) fluorescence spectrum showing predominant CdSe emission.
Figure 6B:
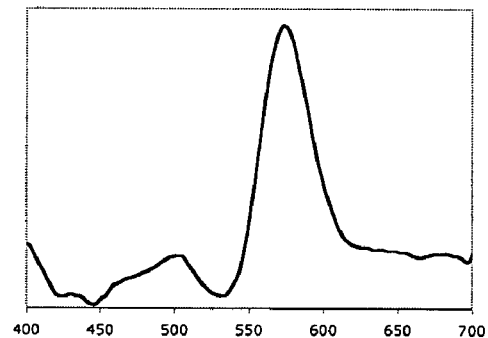

Composite materials of quantum dots and the present polymers, when prepared as described above, show substantial differences in both morphology and optical properties relative to, for instance, blends of CdSe and PPV. While nanoparticle aggregation is common in the blends, the nanoparticles show an excellent random distribution in the composite material produced in this invention. See, FIG. 6A. Striking differences are also seen in the solid-state fluorescence spectra. See, FIG. 6B. The composite materials prepared by the techniques described have solid state fluorescence spectra that are dominated by CdSe nanoparticle emission (ca. 580 nm in the spectrum of FIG. 6B). This stands in marked contrast to CdSe-PPV blends of the prior art, where the PPV emission dominates and serves to mask most of the CdSe nanoparticle emission.

With reference to the following examples and data, this invention can be used to incorporate quantum dots (e.g., CdSe) into electronically-active thin films of organic-based polymers (e.g., PPV), thereby demonstrating: 1) the synthesis of the quantum dots directly in the presence of a functional ligand to give ligand-stabilized nanoparticles with high quantum yield (up to about 65% and greater), without resort to ligand exchange chemistry, and 2) concomitant polymerization (e.g., of 1,4-divinylbenzene and 1,4-dibromobenzene derivatives) in the presence of the functionalized quantum dots for surface-grafting of such polymers. Such methods can promote dispersion of the quantum dots within the polymer, maximize quantum dot-to-polymer interface and produce photophysical effects in the composite that are not seen in conventional blends of nanoparticle and polymers components.

EXAMPLES OF THE INVENTION

The following non-limiting examples and data illustrate various aspects and features relating to the ligand compounds, composites, corresponding polymeric compositions and/or related methods of the present invention, including the preparation of electronically-active polymeric compositions having enhanced emissive characteristics, as are available through the synthetic methodologies described herein. In comparison with the prior art, the present ligands, composites and/or compositions provide results and data which are surprising, unexpected and contrary thereto. While the utility of this invention is illustrated through the use of several composites/polymeric compositions and ligand components which can be used therewith, it will be understood by those skilled in the art that comparable results are obtainable with various other composites/compositions and ligand compounds, as are commensurate with the scope of this invention.

Example 1a

Representative example of CdSe nanoparticle composites with ligand 1. To a 3-neck, 50 mL roundbottom flask equipped with reflux condenser, Ar inlet, septum, and thermocouple probe was added ligand 1 (4.48 g), cadmium acetate (0.21 g), 1-hexadecylamine (2.78 g), and n-hexylphosphonic acid (0.45 g). This mixture was heated under vacuum at 80° C. for one hour. The flask was backfilled with Ar, and the reaction was heated to 270° C. until a homogeneous, colorless solution was present. A solution of selenium (0.20 g) in tri-n-octyl phosphine (4 g) was quickly injected to the hot solution. When the reaction mixture turned orange, the heating mantle was removed from the flask, and the color of the reaction mixture gradually changed from yellow to red. The solution was allowed to cool to room temperature, and anhydrous methanol (ca. 10 mL) was added to precipitate the nanoparticle product. The solution was centrifuged and the supernate decanted. The resulting solid was purified by dissolution in a minimal amount of THF, followed by precipitation into methanol and centrifugation. A red powder was isolated, then dried under $N_2$ purge and stored as a solution in THF or hexanes.

Composites comprising ligand 10, and other ligand compounds of this invention can be prepared as described above, using straight-forward modifications of such techniques as would be understood by those skilled in the art made aware of this invention.

Example 1b

Compound 1 contains a phosphine oxide designed to mimic the quantum dot surface coverage achievable and commonly employed with TOPO, while simultaneously exposing a phenyl bromide substituent for subsequent reaction or polymerization. Compound 1 was prepared by nucleophilic substitution chemistry of di-n-octylphosphine oxide on 4-bromobenzylchloride. (See, example 5b.) This phosphine oxide showed good stability at temperatures needed to grow high quality CdSe nanocrystals (>250° C.), and when used in place of TOPO in the quantum dot synthesis, high quality, spherical nanocrystals were obtained. FIG. 2A shows a high resolution transmission electron microscope (TEM) image taken on a typical sample of 1-covered quantum dots. Electron diffraction revealed the crystalline nature of these materials, and UV-Vis and photoluminescence measurements confirmed their quantum confined nature and considerable quantum yield (65%) (FIG. 2B). Taken together, this data confirms the successful preparation of high quality functionalized quantum dots, where the functionality is generated without ligand exchange chemistry. Other ligand compounds, in accordance with this invention, can be prepared as described above from reaction of a corresponding phosphine oxide with a functionally-substituted benzyl halide. See, for instance, example 5c.

Example 2

PPV-quantum dot composites were synthesized using 1-covered quantum dots under mild palladium catalyzed Heck-type coupling conditions (see, A. F. Littke, G. C. Fu, J. Am. Chem. Soc. 123, 6989-7000 (2001) for Heck-type coupling conditions). A tetrahydrofuran solution of 1-covered quantum dots was stirred at 50° C. for 24 hours in the presence of the monomers 1,4-di-n-octyl-2,5-divinylbenzene and 1,4-dibromo -2,5-di-n-octylbenzene using Pd(0) coupling catalysis. The PPV-quantum dot product was isolated by precipitation into methanol, which separated the Pd catalyst and short -chain PPV not bound to the quantum dot surface. The quantum dot-PPV composite material was isolated as the precipitate, and subsequently redissolved in common organic solvents (e.g., hexanes, $CH_2Cl_2$, THF, etc.).

Alternatively, in a $N_2$ filled drybox, 1-or 10-covered-CdSe nanoparticles (10 mg in 1 mL THF) were combined with N-methyldicyclohexylamine (0.10 g), tetrakistriphenylphosphine palladium (2 mg), and 2,5-dioctyl -4-bromostyrene (0.15 g) in a glass reaction tube equipped with a stirbar and Teflon valve. The reaction was sealed, removed from the drybox, and heated to 90° C. for 16 h. The solution was allowed to cool, then removed from the flask and centrifuged for 15 min. The supernate was decanted, and the CdSe—PPV composite material was precipitated with the addition of methanol. The suspension was centrifuged and the supernate was discarded. The red CdSe—PPV material was dried under a stream of $N_2$ and stored as a solution in THF.

Likewise, various other particulate/ligand composites of this invention can be further modified and incorporated into an electronically-active polymer by reaction with a corresponding excess of divinyl-and dibromobenzene (AA and BB) reagents or bromostyrene (AB) reagents.

Evidence to support successful polymerization was given by nuclear magnetic resonance (NMR) spectroscopy on $CDCl_3$ solutions of the composite material, where singlet resonances at δ 7.33 and 7.23 ppm were observed, corresponding to aromatic and vinylic resonances in the polymer backbone. Matrix-assisted laser desorption ionization-time of flight (MALDI-TOF) mass spectrometry measurements performed on this quantum-dot-PPV composite material confirmed the formation of PPV oligomers, primarily trimers and tetramers. The polycondensation method used in this study is designed to give a mixture of PPV connected to the quantum dots, and "free" or unconnected PPV that acts as the host matrix. It should be emphasized that the compatible nature of the quantum dots with the polymerization conditions was key, and quantum dot degradation was not observed by any of the analytical methods used (TEM, UV-Vis and fluorescence spectroscopy, etc.).

Example 3

As illustrated in FIG. 3, striking differences were observed in the transmission electron micrographs and photoluminescence spectra of the present composite material relative to PPV—CdSe blends prepared by simply mixing the two components. In the case of the composite materials produced in this invention (FIG. 3C), the quantum dots are seen to be well-dispersed throughout the film. However, in blends of PPV with TOPO, pyridine, or 1-functionalized quantum dots (FIGS. 3A and 3B, respectively), gross aggregation of the nanocrystals is observed. The PPV-quantum dot composites were found to possess unique optical properties not found in the blends, also illustrated in FIG. 3. In dilute solution of both blends and composites (blue curves of FIG. 3), PPV oligomers dominate the photoluminescence emission spectra, and only a small fluorescence contribution from the quantum dots is seen. In the solid state, PPV also dominates the photoluminescence of the blends (red curves of FIG. 3A and 3B). However, in the solid-state photoluminescence spectrum of the composite, the quantum dot emission dominates, with almost complete quenching of the PPV emission (red curve, FIG. 3C). This quenching implies an energy transfer from the polymer to the quantum dots. Loss of PPV fluorescence in the solid-state, and emergence of a strong quantum dot emission, is observed even in cases of very low quantum dot loading (e.g., about 2-about 5 wt. % or less than about 10 wt. %). This stands in marked contrast to the high loadings (50% or greater) typically used in quantum dot-conducting polymer composites.

Example 4

Figure 4:
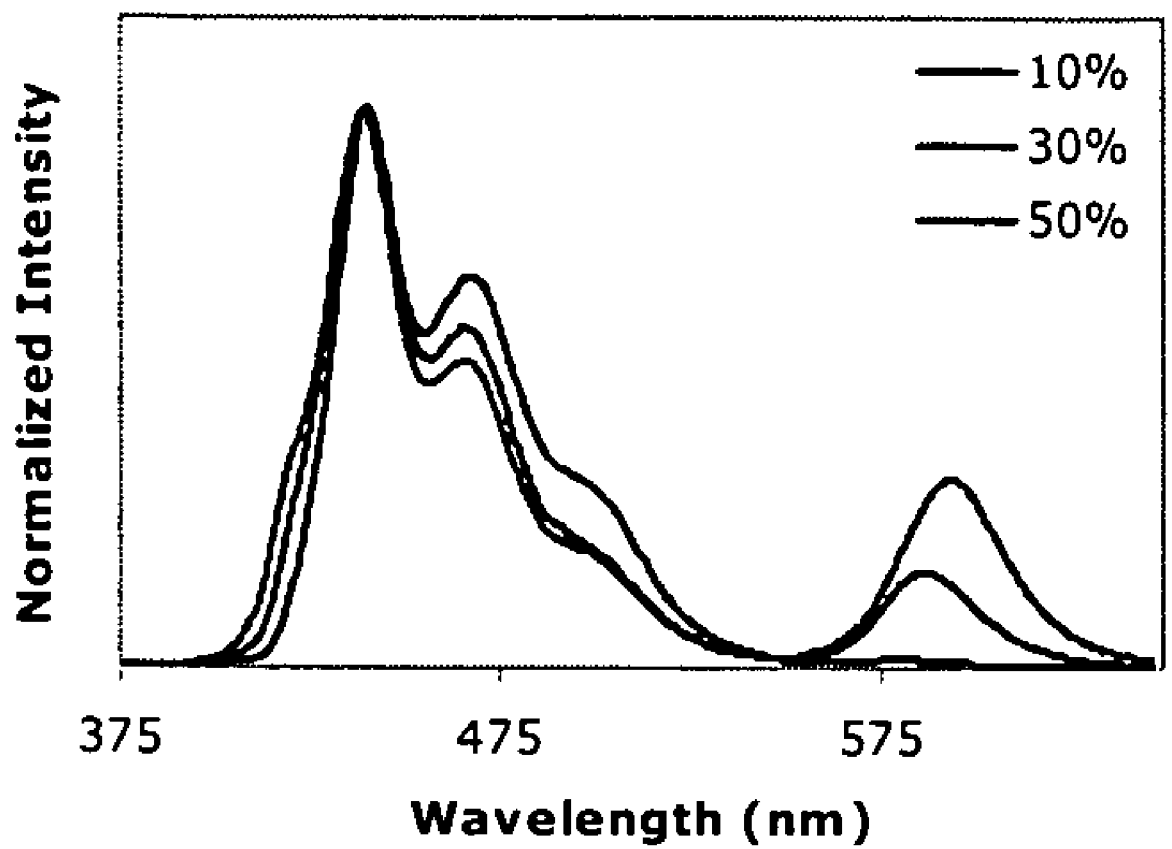
FIG. 4: The solid state photoluminescence emission of 1-functionalized CdSe nanocrystals as a function of weight percent nanocrystal when blended into PPV.

A comparison of the TEM micrographs with the photoluminescence spectra in FIG. 3 provides insight as to the importance of nanocrystal dispersion and effective surface tailoring. While the quantum yield of PPV is expected to diminish due to self-quenching mechanisms when going from solution to the solid state, this in itself does not explain the spectroscopic observations of FIG. 3. These observations can be rationalized by the increased PPV-quantum dot contact in the solid state relative to the more extended conformation of PPV around the quantum dots in solution. Such contact facilitates energy transfer pathways, such that holes generated in the PPV are transferred to the quantum dots, where they subsequently recombine with electrons in the quantum dot core, resulting in emission. However, emission from the quantum dots in the solid state is by far most pronounced in the composite materials prepared by the novel polymerization reported here. In the blends, the high loadings of quantum dots required to observe their emission are shown in FIG. 4, for 10, 30, and 50 wt. % quantum dots in PPV. In these blends, nanoparticle aggregation limits interfacial contact between polymer and quantum dots, thus limiting energy transfer pathways, and furthermore leading to quenching of nanoparticle fluorescence. Even at quantum dot loadings of 50 wt. percent, emission from PPV dominates the spectrum of the blend. The low weight percent of quantum dots that can be utilized effectively in the composite materials described here carries important fundamental and practical economic and environmental implications for advancing quantum dot based materials, assemblies, and devices. This will also open opportunities for the use of quantum dots in conjunction with polymer materials, where the intrinsic structural, morphological, and self-assembly properties of the polymers can be exploited, rather than precluded by an overwhelming presence of the quantum dots.

Example 5a

Various non-polymerized ligand compounds of this invention can be prepared by nucleophilic substitution chemistry of a phosphine oxide on, for instance, a di-halogen substituted aromatic (e.g., phenyl or benzyl) reagent. Substitution (e.g., alkyl or alkoxy) on the phosphorous center is limited only by synthetic or commercial availability. Likewise, the acryl or aromatic reagent can be substituted, such substitution limited only by synthetic or commercial availability, together with phosphine substitution and corresponding steric considerations and/or the sensitivity of any such substituent to reaction conditions.

Example 5b

Preparation of p-bromobenzyl-DOPO (1). To a solution of di-n-octylphosphine oxide (21.9 g, 80.0 mmol, prepared by standard procedures from dibutylphosphite and n-octylMgBr), 4-bromobenzyl chloride (18.5 g, 90.0 mmol), and tetra-n-butyl ammonium hydrogen sulfate (2.9 g) in toluene (330 mL) was added 120 mL of 30 wt % aqueous NaOH solution. The reaction was stirred overnight at 65° C. The product was extracted with $CH_2Cl_2$, and the organic portions were combined and washed with water and brine, dried over $MgSO_4$, filtered, and concentrated to give a viscous liquid. The residue was crystallized from hexane to yield 1 (24.7 g, 85%) as a white solid: (mp 70-71° C.). IR $v_{max}$: 2956, 2922, 2853, 1486, 1466, 1241, 1205, 1160, 1131, 1071, 1013, 861, 832, 746, 717 cm$^{-1}$; $^1$H NMR (300 MHz, CDCl$_3$) δ 7.45 (d, $J_{HH}$=8.2 Hz, Ar—H), 7.13 (d-d, $J_{HH}$=8.5, 6.4 Hz, Ar—H, 2 H), 3.05 (d, $J_{HH}$=13.8 Hz, Ar—CH$_2$—P, 2 H), 1.58 (m, P—CH$_2$—CH$_2$, 4 H), 1.32 (m, CH$_2$, 24 H), 0.88 (t, $J_{HH}$=7.1 Hz, CH$_3$, 6 H) ppm. $^{13}$C NMR (75 MHz, CDCl$_3$, δ) 132.08 (d), 131.68 (d), 131.32 (d), 121.07 (d), 35.90 (d), 31.95, 31.27 (d), 29.26, 29.20, 27.69 (d), 22.81, 21.83 (d), 14.28 ppm. HRMS—FAB (m/z): [M+H]$^+$ calcd for C$_{23}$H$_{41}$BrOP, 443.2078; found, 443.2080.

Example 5c

Preparation of phosphine oxide ligand 10. To a Schienk tube was added 4-bromo-Iodobenzene (1.2 equivalents), di-n-octylphosphine oxide (1 equivalent), CuI (0.05 equivalents), and potassium carbonate (2 equivalents). The reaction tube containing this mixture of reagents was evacuated at about 50 mTorr for one hour, then filled with Ar$_{(g)}$. Toluene was added by syringe, and the mixture was heated to 100° C. for 18 hours. The reaction mixture was cooled, filtered over Celite, and concentrated by evaporation of the organic solvent. The residue was crystallized from hexanes solution to give compound 10 as colorless crystals in 93% yield: $^1$H NMR 7.58 (m, 4H), 1.96 (m, 2H), 1.83 (m, 2H), 1.39 (m, 4 H), 1.22 (m, 20 H), 0.86 (t, 6H) ppm; $^{13}$C NMR 132.12, 126.67, 31.91, 31.21, 30.56, 29.18, 29.16, 22.76, 21.59, 14.24 ppm; $^{31}$P NMR 40.54 ppm.

The preceding examples show a preparation of PPV-tailored quantum dots prepared by novel methods that illustrate, more broadly, the direct connection of such materials to—and dispersal within—such electronically active polymers. The ability to tailor and disperse quantum dots in electronically active thin films dramatically impacts the photophysical properties of these materials relative to conventional blends. While PPV coverage is illustrated here, the novel quantum dot growth methods, and the general polymerization methodology, carries the potential for broad applicability that will enable new physical studies and device fabrication using a wide range of polymer-quantum dot composite materials.

What is claimed is:

1. A conjugated polymeric ligand compound of a formula

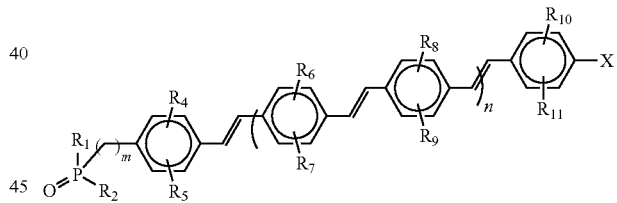

wherein $R_1$-$R_2$ and $R_4$-$R_{11}$ are independently selected from H, alkyl, substituted alkyl, alkoxy, and substituted alkoxy moieties; m is an integer ranging from 0 to about 14; n is an integer ranging from 1 to about 12; and X is selected from halogen and vinyl substituents on the terminal phenylene-vinylene unit of said compound.

2. The ligand compound of claim 1 wherein n ranges from about 3 to about 6; and at least one of $R_4$ and $R_5$, at least one of $R_6$ and $R_9$, and at least one of $R_{10}$ and $R_{11}$ is selected from alkyl, substituted alkyl, alkoxy and substituted alkoxy moieties ranging from about $C_1$ to about $C_{14}$.

3. The ligand compound of claim 2 wherein $R_1$ and $R_2$ are independently selected from alkyl and alkoxy moieties ranging from about $C_6$ to about $C_{14}$.

4. The ligand compound of claim 3 wherein $R_1$ and $R_2$ are independently selected from linear alkyl and alkoxy moieties ranging from about $C_8$ to about $C_{12}$.

5. The ligand compound of claim 3 coordinated with an emissive semi-conductor particulate, to provide a ligand-particulate composite.

6. The ligand compound of claim 5 wherein said particulate is selected from CdSe, ZnSe, CdTe, ZnTe and sulfide compositions thereof.

7. The ligand compound of claim 5, said composite in a composition comprising a polymeric matrix component.

8. The ligand compound of claim 7 wherein said polymeric matrix component comprises the phenylene-vinylene moiety of said ligand compound.

* * * * *